United States Patent
Branch et al.

[15] 3,680,677
[45] Aug. 1, 1972

[54] CONVEYING OF GLASS SHEETS

[72] Inventors: Geoffrey Hindle Branch, Goldborne, near Warrington; James Edward Hall, Billinge, near Wigan; Kenneth Bickerstaff, St. Helens; Albert Patrick Russell-Rayner, Southport, all of England

[73] Assignee: Pilkington Brothers Limited, Liverpool, England

[22] Filed: Sept. 18, 1970

[21] Appl. No.: 73,554

[30] Foreign Application Priority Data

Sept. 19, 1969 Great Britain..............46,410/69

[52] U.S. Cl........................198/20, 198/31 R, 198/81
[51] Int. Cl...........................B65g 47/00, B65g 37/00
[58] Field of Search.....198/31 R, 20, 78, 81; 271/74, 271/DIG. 4; 214/6 FS, 6 DS

[56] References Cited

UNITED STATES PATENTS 3,477,558  11/1969  Fleischauer.................198/184
3,173,557  3/1965  Eliassen.....................198/78 X Primary Examiner—Richard E. Aegerter
Attorney—Burns, Doane, Swecker & Mathis

[57] ABSTRACT

Glass sheets are conveyed in sequence along a main line conveyor which includes means for diverting sheets from the main line conveyor on to branch line conveyors. Selectively operable suction transfer means is provided over the junction of each branch line with the main conveyor, and is operable to lift and convey a sheet over the junction so that it continues along the main conveyor.

10 Claims, 7 Drawing Figures

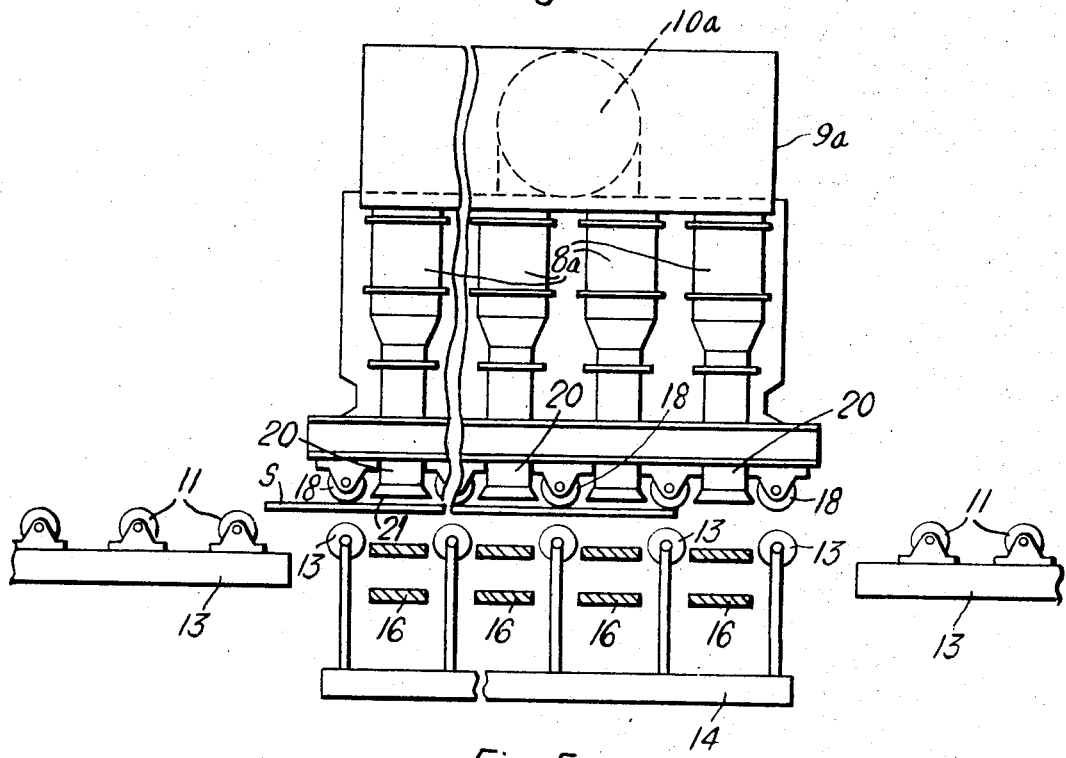
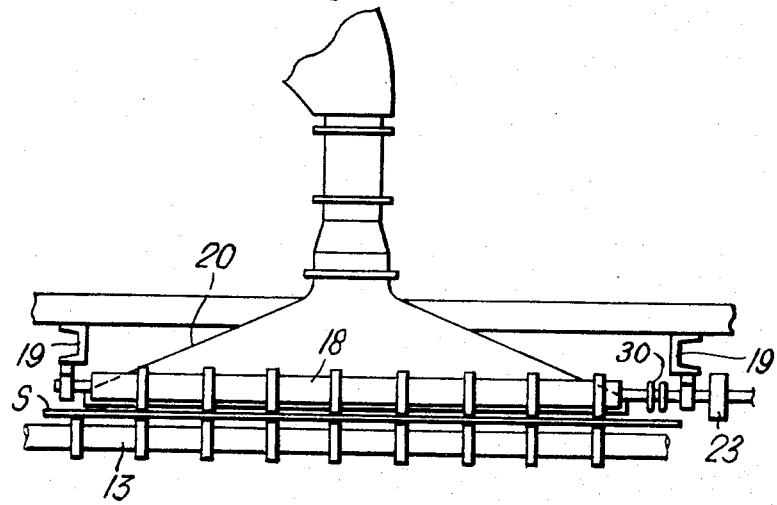

CONVEYING OF GLASS SHEETS

BACKGROUND OF THE INVENTION

This invention relates to the conveying of glass sheets, and more especially to the feeding of glass sheets along different selected paths.

It is a main object of the present invention to provide an improvement in the conveying of glass sheets whereby sheets from a sequence of glass sheets being advanced along a conveyor are diverted from that conveyor at one or more locations while other sheets continue their advance along the conveyor, the diversion of sheets being effected without interfering with the continued advance of the sheets remaining on the conveyor along their predetermined path of travel.

SUMMARY

The invention provides an advance in automatic warehousing for the handling of glass sheets at high speed which are moving in sequence on a main line conveyor. Sheets are selectively diverted from the main line conveyor on to branch line conveyors, and suction transfer means mounted over the junction of each branch line with the main conveyor picks up and transfers a sheet over that junction to continue on the main line conveyor to the next junction where the sheet is diverted on to the next branch line conveyor or transferred over that junction to continue along the main line conveyor.

This enables a subsequent sheet of the sequence on the main line conveyor to be transferred over the preceding sheet which has been arrested by diverter means at a junction and is being diverted on to the branch line leading from that junction.

BRIEF DESCRIPTION OF THE DRAWINGS

FIG. 4 is a side elevation of part of the apparatus of FIG. 2 and 3 showing the suction transfer means in greater detail, FIG. 5 illustrates an end elevation of the suction transfer means of FIG. 4.

DESCRIPTION OF THE PREFERRED EMBODIMENTS

Figure 1:
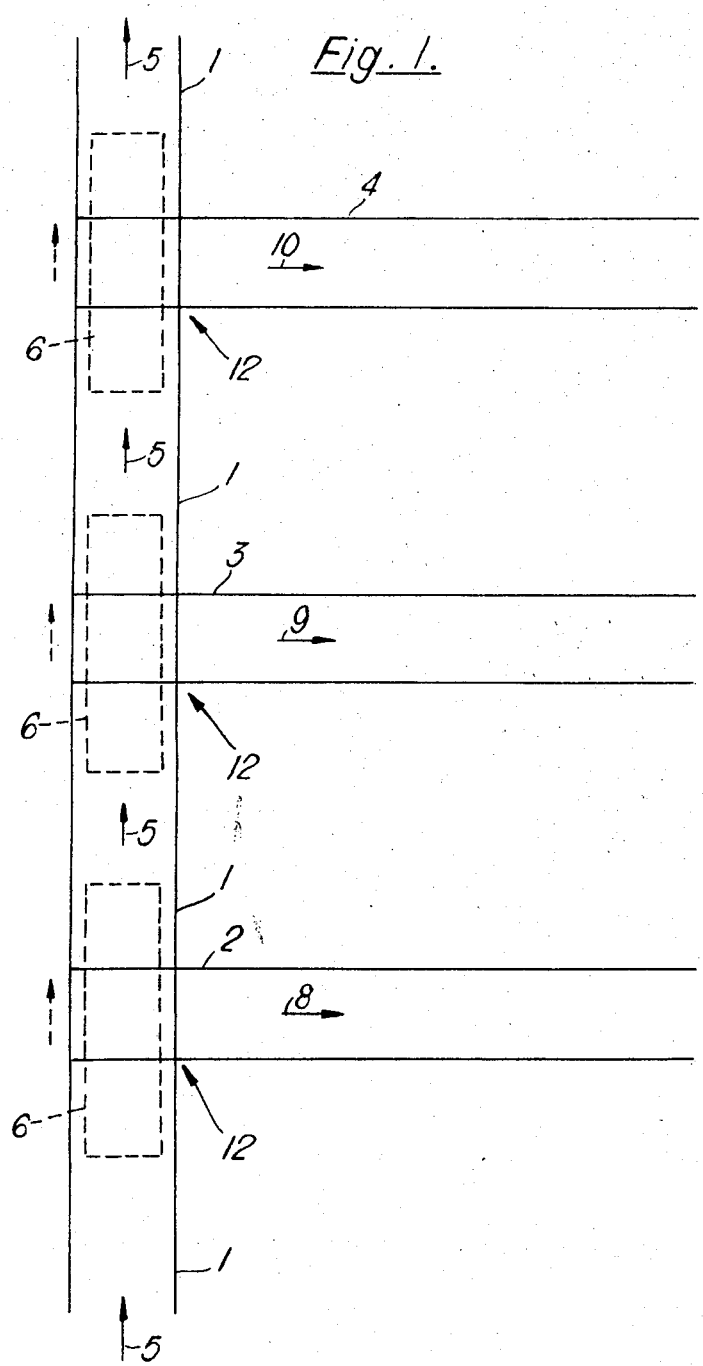
FIG. 1 is a schematic plan view of glass sheets conveying apparatus according to the invention comprising a main line conveyor and a plurality of branch line conveyors.

FIG. 1 illustrates diagrammatically the glass sheet conveying apparatus according to the invention in which glass sheets fed along a main line conveyor 1 can be diverted to any one of a plurality of branch line conveyors 2, 3 and 4. The main line conveyor 1 is usually a roller conveyor comprising driven rollers which in known manner convey a succession of glass sheets along a predetermined path in the direction of the arrows 5. By operation of transfer means to be described the sheets which are to continue advance along the predetermined path of the main line conveyor are transferred over the junction of each branch line 3 and 4 with the main line 1 by means of suction transfer means 6 provided at each junction. The main line conveyor on either side of the junction and the suction transfer means are generally aligned. Also provided at each junction there is an arrangement of diverter means which is operable to divert sheets from the main line conveyor to the selected branch line arranged to extend transversely to the main line conveyor along which the sheet is continually advanced in the direction of the arrow 8, 9 or 10 as appropriate on the branch line conveyor 2, 3 or 4.

The provision of such a conveying apparatus is particularly desirable when the rate of feed of glass sheets along the main line conveyor 1, which is normally dependent on the rate of production of the glass ribbon from which the sheets are cut, is too fast for satisfactory direct handling from the end of a straight conveyor, usually for further cutting and stacking in the warehouse.

By providing a number of branch lines to each of which some of the sheets from the main line are diverted the effective time available for handling any one sheet on one of the branch line conveyors is much longer than the time which would be available if all the sheets were handled from the end of the main line conveyor.

At the same time the transfer arrangement at the junction of each of the branches of the conveying system must be capable of handling sheets at the rate at which those sheets are delivered onto the main line conveyor. This apparatus is thus advantageous not only for speeding up the handling of similar sheets but also can be selectively operated to sort glass sheets into categories for example to meet different cutting requirements.

Figure 2:
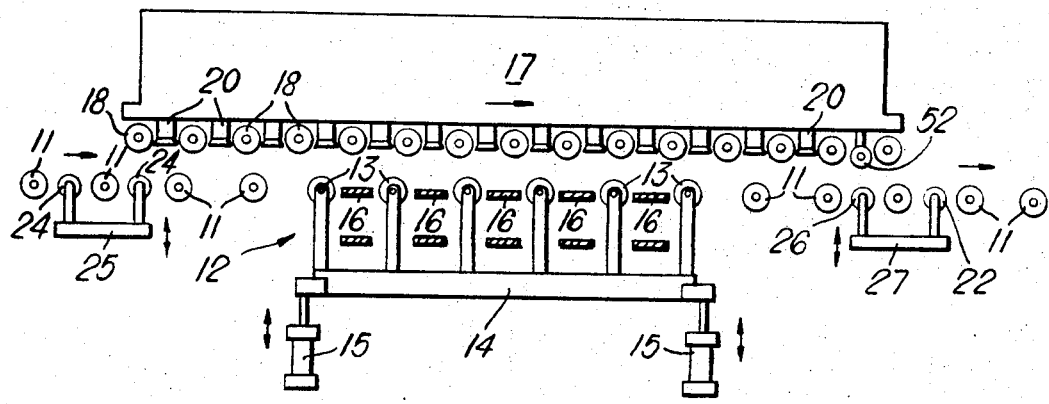
FIG. 2 is a diagrammatic side elevation of transfer apparatus at the junction of one of the branch line conveyors with the main line conveyor.
Figure 3:
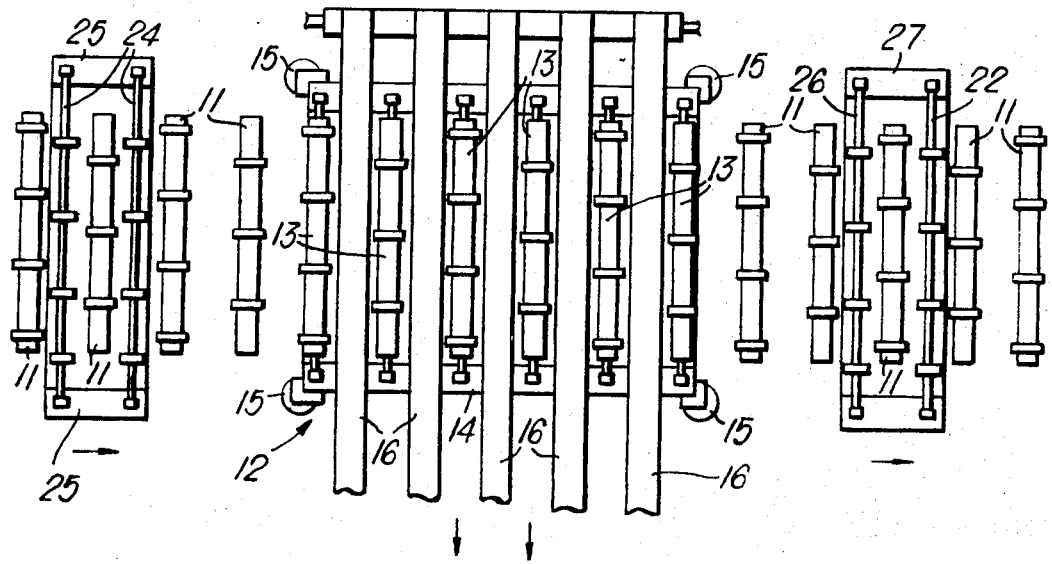
FIG. 3 is a plan view of the apparatus of FIG. 2.

FIGS. 2 and 3 illustrate in more detail the construction of the apparatus at one of the junctions of a branch line conveyor with the main line conveyor. The main line conveyor comprises parallel conveyor rollers 11 which are mounted in bearing blocks not shown on a conveyor bed and are driven in conventional manner. Mounted in a gap in the main line conveyor rollers 11 at the junction where the branch line meets the main line conveyor there is a corner table indicated generally at 12 which constitutes diverter means for diverting a sheet from the main line conveyor to the branch line. The corner table has rollers 13 which are feed rollers arranged parallel to the rollers 11 of the main line conveyor to feed a sheet in the same direction as the main line conveyor. Mounted between the rollers 13 are endless conveyor belts 16 which are parallel to the rollers 13. The rollers 13 are mounted on a frame 14 which is moveable vertically by means of hydraulic jacks 15 between an upper position as illustrated at which the rollers 13 are at the same level as the rollers 11 of the main line conveyor, and a lower position at which the rollers 13 have been lowered below the level of the belts 16.

The belts 16 and the rollers 13 are driven in a switched sequence. The belts are normally stationary, and the drive to the rollers 13 is disconnected when a sheet of glass is fully supported on the corner table 12. Then the frame 14 is lowered and the sheet is transferred to the belts 16. Thereafter the drive to the belts is connected and the sheet is carried along the branch line from the junction. This sequence may be triggered in response to the tripping of a limit switch by the leading edge of the sheet when it is fully supported on the rollers 13 of the corner table.

The branch line conveyor may comprise long belts 16. The belts may however be short leading to a further roller conveyor constituting the rest of the branch line to which the sheet is delivered by the belts 16.

After the sheet has left the corner table the jacks 15 are again operated and the frame 14 and rollers 13 are raised to the level of the main line conveyor for receipt of a further sheet to be diverted onto the branch line.

Figure 6:
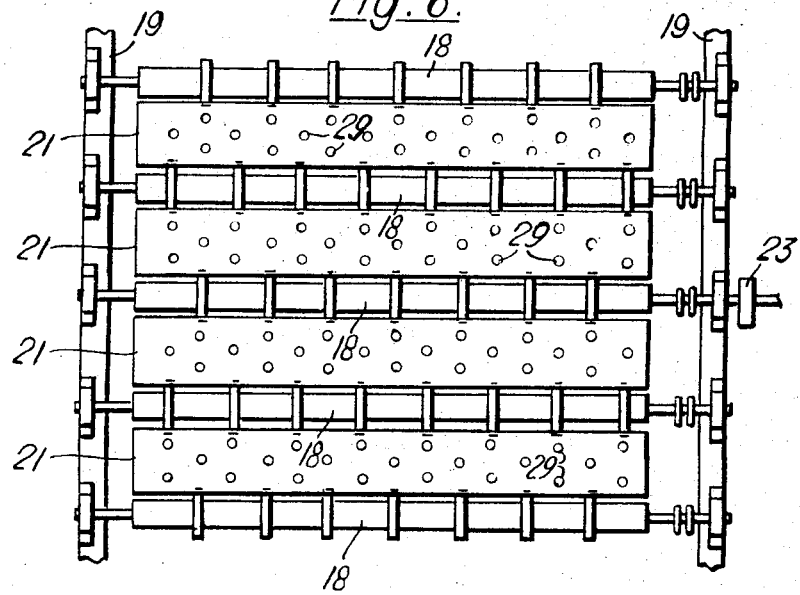
FIG. 6 is an underneath view of the suction transfer apparatus of FIGS. 4 and 5.

Above the corner table 12 there is mounted suction transfer means one embodiment of which is illustrated in greater detail with reference to FIGS. 4, 5 and 6. The rollers 11 of the main line conveyor and the feed rollers 13 of the corner table are constituted with spaced projecting rings of for example rubber which engage the glass sheets being fed. The suction transfer means 17 has rollers of similar constitution. These rollers are a series of rotatable horizontal rollers 18 which are mounted in bearings fixed to a bracket 19 at positions spaced along and above the path of travel of the glass sheets along the main line conveyor 1. The rollers 18 are thus parallel to the rollers 11 of the main line conveyor.

In the space between each pair of successive rollers 18 is a suction chamber 20 the lower end of which is shaped in a splayed manner as shown in FIG. 4 to fit closely into the space between adjacent rollers 18 without contacting those rollers. Each of the suction chambers in side elevation is of hood-like form as shown in FIG. 5. Each suction chamber 20 has a bottom wall formed by a horizontal plate 21 as illustrated in FIG. 6 having equi-spaced holes 29 in the plate. The bottom face of each plate 21 is at a level slightly above that of the lowermost points of the peripheries of the rollers 18 for example by a distance of about 1.2mm.

The suction chambers 20 communicate through respective ducts 8a to a common suction manifold 9a connected by a suction pipe 10a to a fan unit which is not shown.

The rollers 18 are rotatably driven in any convenient manner. For example the rollers 18 may be driven by a chain drive connection each roller shaft carrying suitable sprockets 30 as shown in FIGS. 5 and 6 and one of the rollers has a projecting shaft carrying a drive gear 23 for connecting to a main drive unit. The rollers 18 are driven at the same speed as the rollers 11 of the main line conveyor. The bracket 19 carrying the rollers 18 is supported at a required level by support struts mounted on the bed of the conveyor apparatus.

Glass sheets S are fed in spaced succession on the rollers 11 of the main line conveyor to the junction of the main line conveyor with one of the branch lines for example the branch line conveyor 2. The rollers 18 of the transfer suction means are mounted at a level above the rollers 11 of the main line conveyor such that when a glass sheet is being carried by the transfer apparatus over the junction another glass sheet can be fed onto the corner table. Thus the height of the lowermost points of the peripheries of the rollers 18 above the uppermost points of the peripheries of the rollers 13 is slightly greater than twice the thickness of the thickest sheets of glass which are to be conveyed so that a glass sheet can be transferred over the junction by the suction transfer means at the same time as the following glass sheet is being diverted from the corner table to the branch line conveyor.

As shown in FIGS. 2 and 3 guiding; means are provided to lift a sheet S to be transferred along the predetermined path of the main line conveyor into effective range of the suction applied by the suction chambers 20 between the rollers 18 of the suction transfer means. Thus a group of rollers 24 of the main line conveyor are mounted on a vertically moveable frame 25 near to the beginning of the gap in the conveyor in which the corner table is mounted. As a sheet to be transferred across the junction approaches the corner table the frame 25 is raised to lift the sheet into the effective range of the suction of the suction transfer means and as the upper surface of the sheet approaches the bottom of the first suction chambers 20 a reduced pressure is created over the sheet due to the restriction to air flow offered by the gap between the sheet and the bottom of the respective suction chamber; this reduced pressure holds the sheet against the rollers 18 of the suction transfer apparatus. These rollers are being driven and therefore move the suctionally held sheet forwardly along the rollers over the junction with the branch line conveyor. Since the peripheries of the rollers 18 extend slightly below the lower face of the bottom plates of the suction chambers the glass sheets are transferred over the junction without contacting the suction chambers.

If preferred the frame 25 carrying the rollers 24 may be pivoted about an axis towards its upstream end so that it is moved in a pivotal manner to incline the sheet by lifting its leading end and lead it into the effective range of suction instead of subjecting the horizontal sheet to a straight forward vertical lift.

In an alternative arrangement the lifting facility for the rollers 24 may be omitted and the suction applied to the transfer means may be sufficient to effect the required lift of a sheet. In this case the transfer means may be controlled by applying suction when a sheet approaching the corner table is to be carried thereover, and cutting off suction when an approaching sheet is to be received by the corner table for diversion along the branch line.

At the downstream end of the suction transfer means 17 there are mounted prising rollers 52 at either side of the transfer means which rollers extend downwardly below the level of the rollers 18. When a sheet reaches the downstream end of the transfer means 17 the prising rollers force the sheet downwardly away from the rollers 18 so breaking the suction and causing the suctionally held sheet to fall downwardly towards a group of lowering rollers 26 mounted on a frame 27 which is vertically moveable by means of hydraulic jacks for example from the uppermost position at which the rollers 22 receive the sheet prised away from the suction transfer means to a lower position at which the rollers 22 are level with the continuation rollers 11 of the main line conveyor. Thus after having transferred across the junction the transferred sheet is lowered onto the continuation of the main line conveyor and continues on its predetermined path.

If preferred the frame 27 carrying the rollers 26 may be pivoted about an axis toward its downstream end and arranged to move in a pivotal manner such that the sheet is received on the rollers which inclined and lead into the horizontal.

Other means may be provided effective to deposit sheets from the transfer means for example air jets or means controlling the air flow in the last suction chambers at the downstream end of the transfer means for example by reversing the air flow through the suction chambers, or by opening the chambers to atmosphere, as described in co-pending application Ser. No. 73,032, filed Sept. 17, 1970 (U.K. application No. 46409/69).

Alternatively, the disengagement of the sheet from the rollers 18 of the transfer means may be effected solely by the action of gravity as the sheet moves out of the effective range of the applied suction and falls under its own weight onto the rollers 11.

Figure 7:
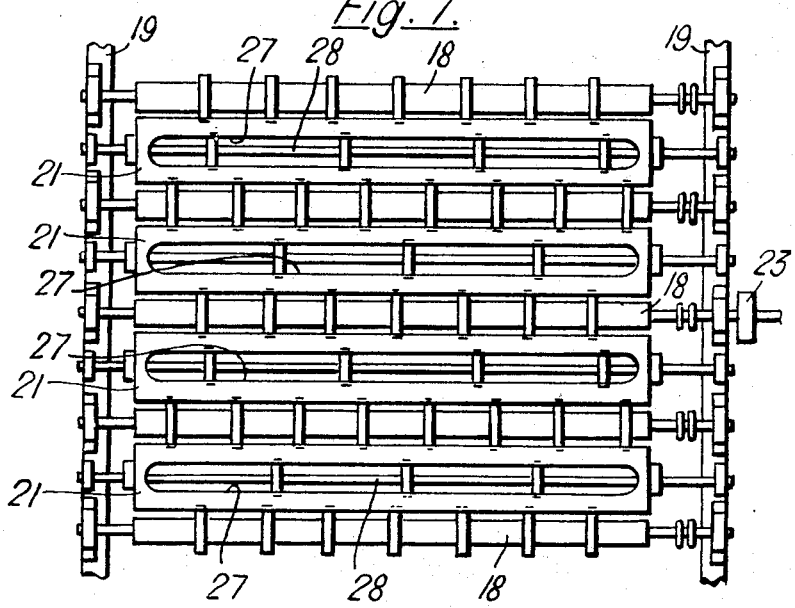
FIG. 7 is an underneath view of an alternative embodiment of the suction transfer apparatus of FIGS. 4 and 5.

FIG. 7 shows a modified form of base plate 21 for the suction chambers 20. Each base plate 21 is formed with a slot 31 extending parallel to the rollers 18 instead of the holes 29 shown in FIG. 6.

FIG. 7 also shows additional rollers 28 mounted in the suction chambers 20 so that their peripheries project slightly through the slots 31. The lowermost points of the peripheries of the rollers 28 are level with the lowermost points of the peripheries of the main drive rollers 18 of the suction transfer means and the rollers 28 and 18 are driven from the same drive. Alternatively the rollers 28 may be idler rollers, in which case they are preferably set with the lowermost points of their peripheries at a level very slightly above that of the lowermost points of the peripheries of the drive rollers 18. In some circumstances these idler rollers 28 are desirable to assist in preventing contact between the upper surface of the sheet being transferred and the suction chambers 20 particularly when the glass sheets being transferred over the junction are relatively thin and therefore flexible.

Other forms of suction transfer means may be employed for example as described in said copending application.

The invention thus provides an improved apparatus for glass sheet conveying which enables glass sheets being fed in sequence along the main line conveyor to be handled with much greater speed than would normally have been possible.

The diverting of sheets to the branch lines may be effected on any suitable selective basis. For example, where the sheets being fed are substantially identical, whether a sheet approaching a corner table is transferred over that corner table to continue along the main conveyor line or is diverted to the branch line leading from that corner table may be dependent on whether or not that corner table is still occupied by a preceding sheet. Thus, there may be provided detector means at each corner table to sense the presence of a sheet thereon, such detector means serving to control the operation of the transfer means so that sheets are transferred over the corner table while the latter is occupied by a sheet. In particular, the detector means may comprise a first limit switch operated by a sheet on the corner table, and hence effective to sense when the corner table is occupied, and a second limit switch operated by the frame 14 and effective to sense when the frame, and hence the rollers 13, are in the raised position. With this arrangement the transfer means can operate under the control of the limit switches so that each sheet approaching the corner table is transferred thereover unless the table is unoccupied and the frame 14 is in its raised position. It will be appreciated that when diversion of sheets is effected on the above described basis, maximum utilization is made of the first (upstream) branch line since, in effect, it has the first option of accepting a sheet, and each subsequent branch line receives only sheets which have been transferred over the preceding corner table or tables by reason of their being occupied.

An alternative basis where the sheets being fed are identical, and which can provide a more even distribution of sheets between the branch lines, is for the transfer means to operate responsively of sheet counting so that, after a corner table receives a sheet, its associated transfer means transfers a number of successive sheets equal to the number of branch lines downstream of that corner table. With this basis each of '$n$' branch lines receives one of '$n$' successive sheets initially fed by the main line conveyor.

Where the sheets initially fed on the main conveyor line have distinguishable characteristics, e.g., are of a number of different sizes, the conveying system can sort the sheets into categories. Thus, the corner table diverting means and suction transfer means can be selectively operable by sensing the nature of a glass sheet and either feeding the sheet along its predetermined path or diverting it from that path in accordance with a characteristic of the sheet for example the size of the sheet so that sheets of a certain size can be diverted into a selected one of the branch line conveyors.

Provision may be made in the conveying system for dealing with sheets which become badly damaged and are destined for cullet. Notably a cullet station may be provided in the main conveyor line a short distance upstream from each corner table and its associated transfer means, whereby the delivery of badly damaged sheets to the corner tables or the transfer means can be minimized. The branch conveyor lines may also be provided with cullet stations as required.

It will be appreciated that the exact lay-out of the conveyor system may be adapted to meet particular requirements. Notably, the branch lines need not all lead to the same side of the main conveyor line as shown in FIG. 1, but may lead to opposite sides.

Although the conveying system is under automatic control by provision of suitable switching, counting, timing and/or inspection devices which actuate the relevant parts of the apparatus, the system preferably embodies a manual control arrangement whereby the automatic control can be over-ridden under the direction of an operator so as to permit the operator to clear readily any blockages which may occur, for example if a sheet breaks. Where the system is used to sort sheets into categories the automatic control would normally incorporate computer means operative to assist in the selective sorting of the sheets.

The present invention thus constitutes an important contribution to the development of automatic warehousing facilities for the handling of glass sheets at high speed and is particularly effective in handling glass sheets cut from a ribbon of glass emerging at a high speed.

We claim,

1. Glass sheet conveying apparatus comprising:
   a main line conveyor operable to convey glass sheets along a predetermined path,
   a plurality of branch line conveyors leading from the main line conveyor extending transversely therefrom at junction positions spaced apart along the main line conveyor,
   a plurality of suction transfer means each located over one said junction of a branch line conveyor with the main line conveyor for lifting a glass sheet from the main line conveyor, feeding the sheet over the junction and then redepositing the sheet on the main line conveyor at the far side of the junction,
   said main line conveyor on either side of said junction and said suction transfer means being in general alignment along said predetermined path of travel, and
   diverter means at each junction for diverting sheets from the main line conveyor on to the branch line conveyor extending from that junction.

2. Apparatus according to claim 1, wherein each said suction transfer means is arranged at a height above the main line conveyor just greater than twice the thickness of the thickest sheets to be conveyed, to hold a sheet being conveyed across said junction at a level clear of another sheet at the junction.

3. Apparatus according to claim 2, wherein the main line conveyor is a roller conveyor, and each said suction transfer means includes a plurality of driven rollers spaced apart over said junction and suction means associated with the driven rollers and operable to create a reduced pressure over a sheet which is to continue in the predetermined path, thereby drawing the sheet against the rollers for conveying across the junction.

4. Apparatus according to claim 3, wherein each said suction transfer means further comprises a pair of prising rollers mounted over the continuation of the main line conveyor beyond the junction over which said suction transfer means is located, which prising rollers extend downwardly below the level of the driven rollers of the suction transfer means to force a sheet downwardly away from said driven rollers.

5. Apparatus according to claim 1, wherein each branch line conveyor is set at a lower level than the main line conveyor, and said diverter means at each junction comprises a vertically moveable table supported at each junction by means operable to lower and raise the table between the level of the main line conveyor and the level of the branch line conveyor.

6. Apparatus according to claim 5, wherein each table includes driven feed rollers arranged to feed a sheet in the same direction as the main line conveyor, feed belts are disposed at each junction between and parallel to said feed rollers to convey a sheet from the table transversely to the branch line conveyor, and each junction further includes means for lowering the table to lower the feed rollers relative to the belts to deposit on the belts a sheet initially carried on said feed rollers.

7. Apparatus according to claim 5, wherein the main line conveyor includes a group of conveyor rollers just beyond each junction, a vertically movable frame on which said group of rollers is mounted, and means for raising said frame to raise the group of rollers to receive a sheet prised from the suction transfer means and to lower the rollers down to the level of the main line conveyor beyond the junction.

8. A glass sheet conveying apparatus comprising:
   a main line conveyor having a plurality of junctions defining breaks in said conveyor and being operable to convey glass sheets along a predetermined path,
   a plurality of suction transfer means each located over one of said junctions in alignment with the path of travel of said main line conveyor for lifting a glass sheet from the main line conveyor and for feeding the sheet over said junction and then redepositing said sheet on said main line conveyor,
   a plurality of branch line conveyors extending transversely from the main line conveyor at said junctions of said main line conveyor,
   diverter means at each junction for receiving sheets directly from said main line conveyor and for directing them along said branch line conveyor, and
   selectively operable guiding means cooperating with said main line conveyor adjacent said branch line conveyor and having a first position for guiding said sheet to said suction transfer means and a second position for guiding said sheet directly onto said diverting means.

9. Apparatus according to claim 8, wherein said main line conveyor is a roller conveyor and said guiding means includes a group of conveyor rollers just preceding each junction, a vertically movable frame on which said group of rollers is mounted, and a lifting device connected to the frame to lift the frame and a sheet on said group of rollers mounted on the frame into the effective range of the suction transfer device located over that junction.

10. A method of diverting from a feed of glass sheets along a main line conveyor defining a predetermined path of travel, a selective feed of sheets along a plurality of branch line conveyors leading from junctions with the main line conveyor and extending transversely to said main line conveyor, comprising at each junction applying suction to create a reduced pressure over the upper surface of selected sheets to raise the sheets from said main conveyor portion when they reach the junction, and feeding said selected sheets thus suctionally held across said junction, and redepositing said selected sheets on the main line conveyor portion beyond said junction for continued travel along said main line conveyor, said main line conveyor positioned on either side of said junction and said junction being generally aligned.

* * * * *